(12) United States Patent
Ting et al.

(10) Patent No.: US 12,725,475 B2
(45) Date of Patent: Sep. 1, 2026

(54) ELECTRONIC DOOR LOCK INTERCOM SYSTEM

(71) Applicant: Yi-Liang Ting, Taipei City (TW)

(72) Inventors: Yi-Liang Ting, Taipei City (TW); Jason Zheng, Taipei City (TW)

(73) Assignee: Yi-Liang Ting, Taipei City (TW)

( * ) Notice: Subject to any disclaimer, the term of this patent is extended or adjusted under 35 U.S.C. 154(b) by 16 days.

(21) Appl. No.: 18/931,233

(22) Filed: Oct. 30, 2024

(65) Prior Publication Data

US 2026/0051210 A1 Feb. 19, 2026

(30) Foreign Application Priority Data

Aug. 19, 2024 (TW) ................................. 113131111

(51) Int. Cl.
*G07C 9/00* (2020.01)
*G07C 9/10* (2020.01)
*H04L 67/125* (2022.01)

(52) U.S. Cl.
CPC ..... *G07C 9/00309* (2013.01); *G07C 9/00571* (2013.01); *G07C 9/10* (2020.01); *H04L 67/125* (2013.01)

(58) Field of Classification Search
CPC .. G07C 9/00309; G07C 9/00571; G07C 9/10; G07C 9/00904; G07C 9/00944; G08B 13/19656; G08B 13/1966; E05B 2047/0091; E05B 45/06; H04L 67/125; H04N 7/186
See application file for complete search history.

(56) References Cited

U.S. PATENT DOCUMENTS

| | | | | |
|---|---|---|---|---|
| 5,784,446 | A * | 7/1998 | Stuart | H04M 11/025 379/159 |
| 9,237,318 | B2 * | 1/2016 | Kasmir | H04N 23/20 |
| 2015/0186840 | A1 * | 7/2015 | Torres | A47B 81/00 705/339 |
| 2017/0016249 | A1 * | 1/2017 | Johnson | G08B 13/19656 |
| 2017/0236350 | A1 * | 8/2017 | Lin | G07C 9/00309 340/5.61 |
| 2018/0181094 | A1 * | 6/2018 | Funk | H04L 67/12 |
| 2018/0261029 | A1 * | 9/2018 | Johnson | E05C 1/004 |
| 2019/0387104 | A1 * | 12/2019 | Yssa | G07C 9/00309 |
| 2020/0095800 | A1 * | 3/2020 | Koski | E05B 17/226 |

(Continued)

FOREIGN PATENT DOCUMENTS

CN 218568091 U * 3/2023

*Primary Examiner* — Adnan Aziz

(57) ABSTRACT

An electronic door lock intercom system includes a cloud platform; an Internet service provider, communicated with the cloud platform; a plurality of indoor units installed at indoor locations of a plurality of housing units, a plurality of first electronic door locks installed at local gates of the plurality of housing units, an outdoor unit provided outdoors in a public area of the housing units, and a second electronic door lock provided at a remote gate in the public area, communicated with the Internet service provider; and at least one application device, communicated with the Internet service provider. Through different arrangements of each component, it can be applied to different scenarios and can be remotely monitored through the application devices of user, property management or front-end management to achieve safety management.

10 Claims, 15 Drawing Sheets

(56) References Cited

U.S. PATENT DOCUMENTS

| | | | | |
|---|---|---|---|---|
| 2020/0349786 | A1* | 11/2020 | Ho | G06V 40/172 |
| 2021/0010315 | A1* | 1/2021 | Honjo | H04L 12/2827 |
| 2021/0406820 | A1* | 12/2021 | Yamakawa | H04M 9/02 |
| 2023/0154266 | A1* | 5/2023 | Carter | G06V 20/52<br>340/541 |
| 2023/0273985 | A1* | 8/2023 | Suchan | G06F 3/012<br>726/18 |
| 2024/0005718 | A1* | 1/2024 | Kuttuboina | G06Q 50/163 |
| 2024/0271464 | A1* | 8/2024 | King | G07C 9/00944 |

* cited by examiner

ELECTRONIC DOOR LOCK INTERCOM SYSTEM

CROSS-REFERENCE TO RELATED APPLICATIONS

This application claims the priority of Taiwanese patent application No. 113131111, filed on Aug. 19, 2024, which is incorporated herewith by reference.

PRIOR ART

FIG. 1 is a schematic diagram of an architecture of a prior art intercom system. FIG. 1 takes four floors as an example. Each user from the second floor to the fourth floor is equipped with an indoor unit 100' and an electronic door lock 200', while the shared first floor is equipped with a mechanical door lock 300' and an outdoor unit 400'. The indoor units 100' on each floor are electrically connected to each other through a door opening control line 500', and are also electrically connected to the mechanical door lock 300'. And the indoor units 100' on each floor are electrically connected to each other through a data transmission line 600', and are also electrically connected to the outdoor unit 400'.

When a visitor presses the button of the outdoor unit 400' and the doorbell of the indoor unit 100' of the corresponding floor rings, the resident immediately makes a call through the indoor unit 100', and then presses the door opening button of the indoor unit 100' to open the mechanical door lock 300' to open the first floor door; after the visitor enters the gate on the first floor, he then goes to the corresponding floor and presses the doorbell of the electronic door lock 200' at the door of the resident. The resident opens the door after confirming that it is correct.

However, the architecture of the above system cannot be applied to residences or communities with property management and front desk management. Moreover, if the resident is not at home, it is not possible to immediately notify the resident of the arrival of a visitor or to carry out control. Especially with the current popularity of online shopping, when logistics personnel or postmen deliver goods to their home, they cannot immediately notify the resident to pick up the goods, causing the logistics personnel to repeat the work It was very inconvenient to come several times. For residents in community housing, it is easy for residents to enter and exit complexly, and they do not know which household the visitor is, and cannot identify or record their data, which can easily cause danger to other residents.

BACKGROUND OF THE INVENTION

The present invention relates to the technical field of door locks, in particular to an electronic door lock intercom system that can be applied to user terminals, property management sides and hotel management sides.

SUMMARY OF THE INVENTION

A primary objective of the present invention is to provide an electronic door lock intercom system that can be easily configured through different configurations of an indoor unit, an electronic door lock corresponding to the indoor unit, an outdoor unit, an electronic door lock corresponding to the outdoor unit, and an application device, individual users, communities and collective housing with or without property management, hotel operators with or without front desk management, caring for the elderly living alone, elderly people with dementia and children temporarily staying at home, etc., and can be managed through users and property management Or the front-end management application device can be used for remote monitoring to achieve the effect of security management. The different configurations can be applied to different situations such as simple configuration, individual users, communities and residential buildings with or without property management, hotel operators with or without front desk management, caring for the elderly living alone, elderly people with dementia and children temporarily staying at home, etc. Remote monitoring can be carried out through user, property management or front desk management application devices to achieve safety management.

In order to achieve the aforementioned objective, the present invention provides an electronic door lock intercom system. The electronic door lock intercom system includes a cloud platform; an Internet service provider, communicated with the cloud platform; at least one indoor unit, communicatively connected to the Internet service provider, and the at least one indoor unit is installed in an indoor location of a user's residence; at least one first electronic door lock, communicatively connected to the Internet service provider, and the at least one first electronic door lock is installed at a local gate of the user's residence; an outdoor unit, communicatively connected to the Internet service provider, and the outdoor unit is installed outdoors of the user's residence; a second electronic door lock, communicated with the Internet service provider, and the second electronic door lock is installed at a remote gate of the user's residence; and at least one application device, communicated with the Internet service provider.

In some embodiments, the cloud platform, the at least one indoor unit, the at least one first electronic door lock, the outdoor unit, the second electronic door lock and the at least one application device are communicated with the Internet service provider through a wireless network.

In some embodiments, the at least one first electronic door lock and the second electronic door lock are electrically connected to the Internet service provider through an Ethernet power supply wiring.

In some embodiments, the Internet service provider is a network switch or a router.

In some embodiments, the at least one application device is a smartphone, a tablet and an Internet TV.

In some embodiments, the at least one first electronic door lock and the second electronic door lock each have a front panel and a rear panel.

In some embodiments, the front panel includes an electronic cat's eye, a speckle projector, an infrared fill light, a face and palm vein infrared camera, a virtual password identifier, a physical keyhole and a near field communication identifier, the electronic cat's eye, the speckle projector, the infrared fill light and the face and palm vein infrared camera are arranged on an upper part of the front panel, the physical keyhole is arranged on a lower part of the front panel, and the virtual password identifier and the near field communication device are arranged between the upper part and the lower part of the front panel.

In some embodiments, the front panel further includes an electronic doorbell disposed between the virtual password identifier and the upper part.

In some embodiments, the rear panel includes an electronic cat's eye display screen, which is electrically connected to the electronic cat's eye.

In some embodiments, the at least one application device has an application program installed, when the at least one first electronic door lock or the second electronic door lock sends an abnormal alarm reminder notification, the abnormal alarm reminder notification is transmitted to the at least one application device corresponding to the application program through a wireless network to generate an alarm reminder.

In order to make the above objectives, features and advantages of the present invention more obvious and understandable, the specific embodiments listed in the drawings are described in detail below.

BRIEF DESCRIPTION OF DRAWINGS

Aspects of the present invention are best understood from the following detailed description when read with the accompanying figures. It is noted that, in accordance with the standard practice in the industry, various features are not drawn to scale. In fact, the dimensions of the various features may be increased or reduced for clarity of discussion.

DETAILED DESCRIPTION OF THE INVENTION

It will be appreciated that, although specific embodiments of the present invention are described herein for purposes of illustration, various modifications may be made without departing from the spirit and scope of the present invention.

In the following description, certain specific details are set forth in order to provide a thorough understanding of various aspects of the disclosed subject matter. However, the disclosed subject matter may be practiced without these specific details. In some instances, well-known structures and methods of power delivery comprising embodiments of the subject matter disclosed herein have not been described in detail to avoid obscuring the descriptions of other aspects of the present invention.

Unless the context requires otherwise, throughout the specification and claims that follow, the word "comprise," "have," "include," and variations thereof, such as "comprises," "comprising," "having," "including" are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present invention.

Figure 1:
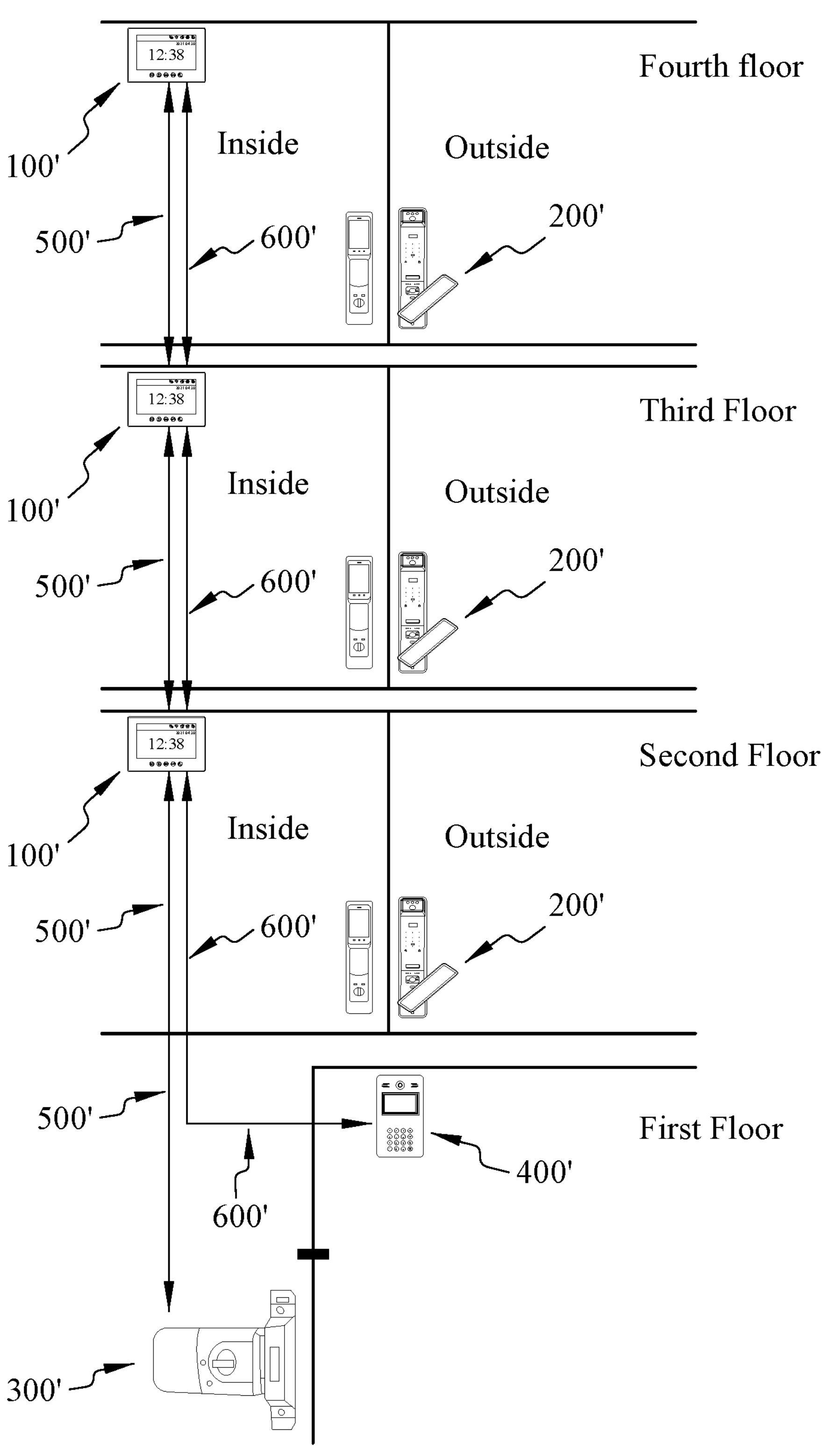
FIG. 1 is a schematic diagram of an architecture of a prior art intercom system.
Figure 2:
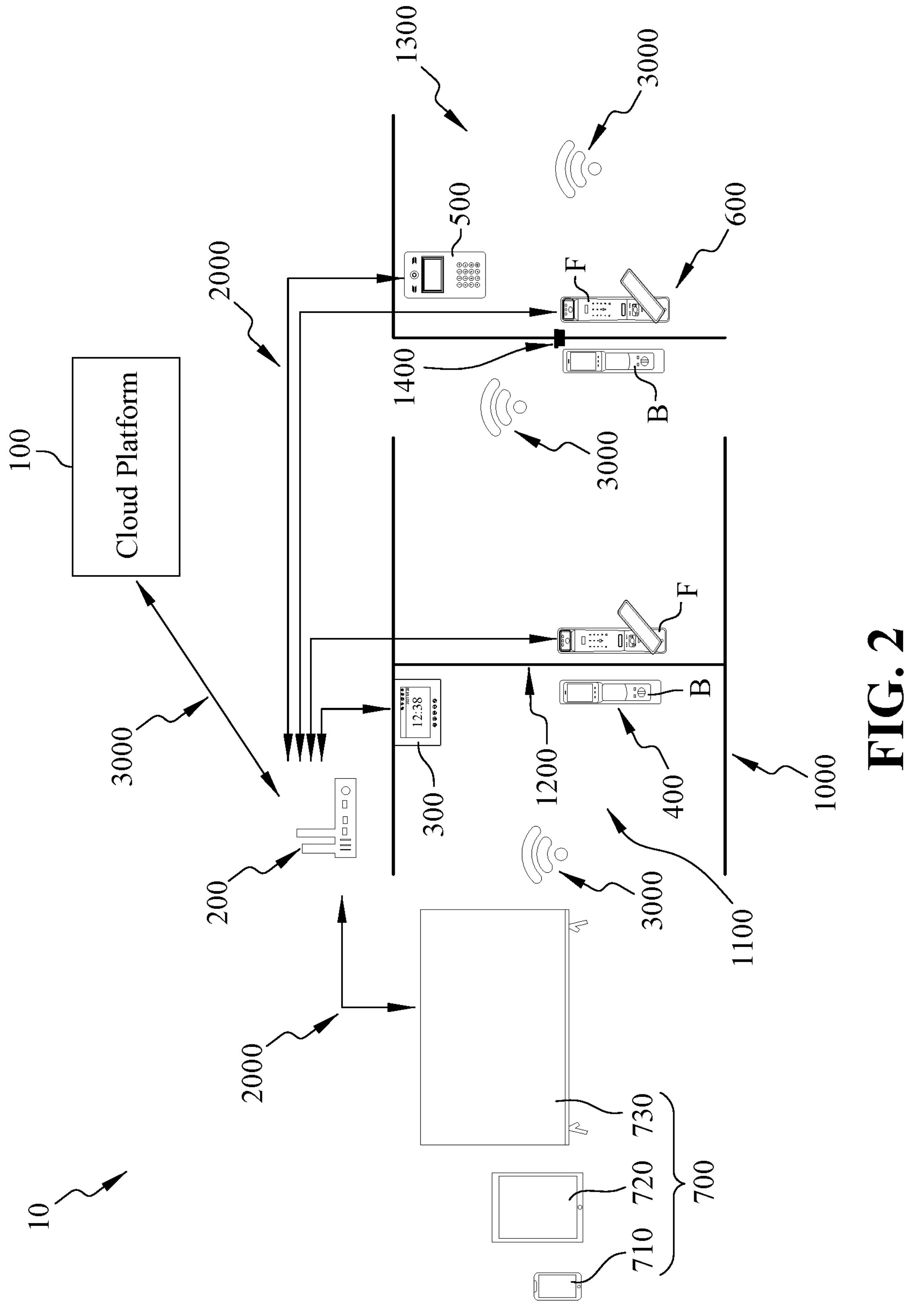
FIG. 2 is a schematic diagram of an electronic door lock intercom system according to the present invention.

FIG. 2 is a schematic diagram of an electronic door lock intercom system according to the present invention.

Please refer to FIG. 2, the electronic door lock intercom system 10 of the present invention includes a cloud platform 100, an Internet service provider 200, at least one indoor unit 300, at least one first electronic door lock 400, an outdoor unit 500, a second electronic door lock 600 and at least one application device 700.

The cloud platform 100 may be a commonly known cloud platform, but not limited thereto.

The Internet service provider 200 may communicate with the cloud platform 100. In some embodiments, the Internet service provider 200 may be a network switch or a router, but not limited thereto.

Figure 5:
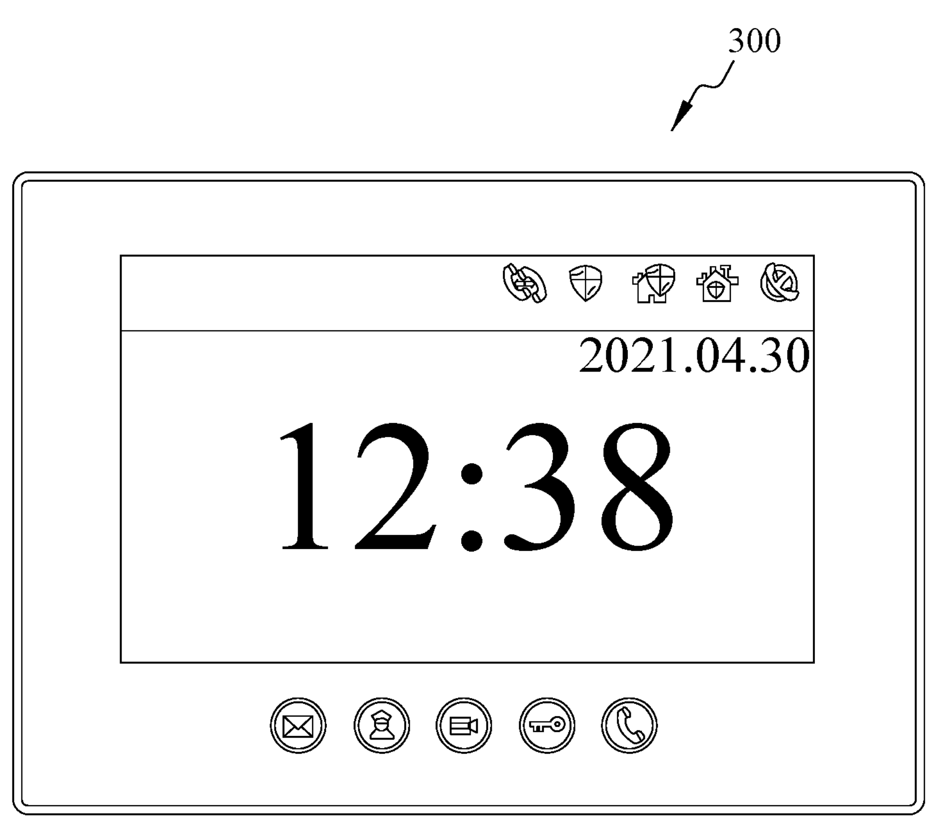
FIG. 5 is a schematic diagram of the indoor unit at the user end of the electronic door lock intercom system according to the present invention.
Figure 6:
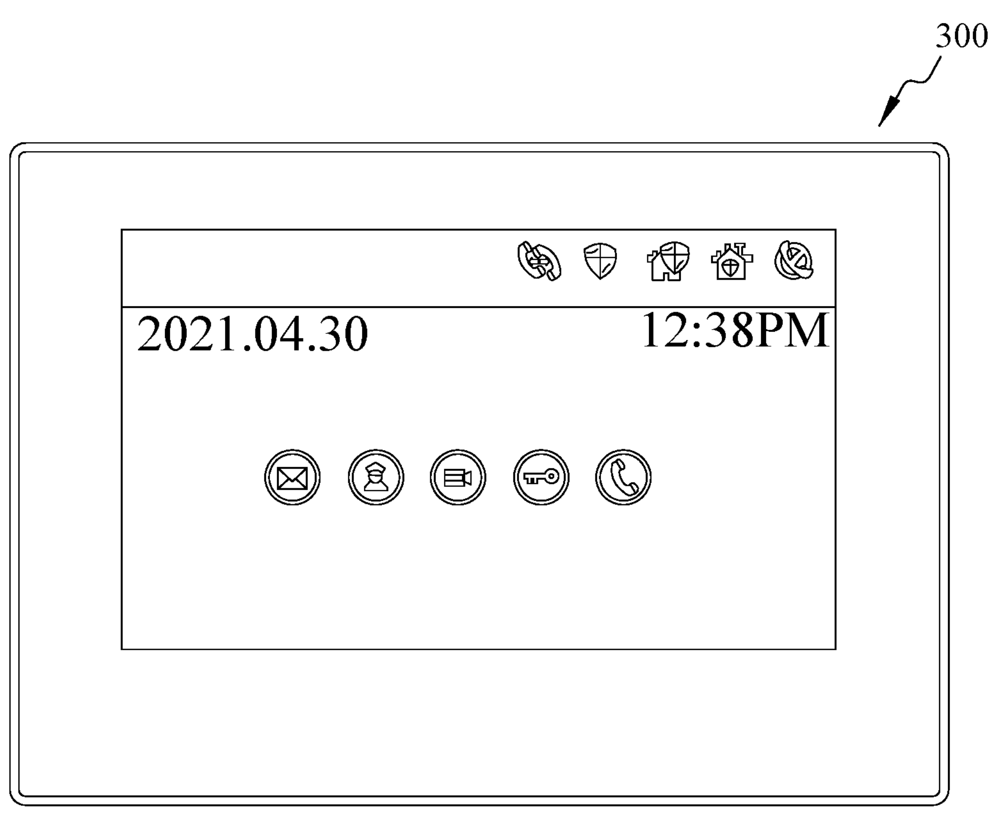
FIG. 6 is a schematic diagram of the indoor unit at the property management end or hotel management end of the electronic door lock intercom system according to the present invention.

FIG. 5 is a schematic diagram of the indoor unit at the user end of the electronic door lock intercom system according to the present invention. FIG. 6 is a schematic diagram of the indoor unit at the property management end or hotel management end of the electronic door lock intercom system according to the present invention.

Please refer to FIG. 2, FIG. 5 and FIG. 6, the indoor unit 300 may be communicatively connected to the Internet service provider 200, and the indoor unit 300 may be arranged at a room 1100 in a user's residence 1000, in further, the user's residence 1000 may include, for example, the user's own home, a property management office, or a hotel or B&B front desk management office, but not limited thereto. In some embodiments, the indoor unit 300 may be used for the user end (as shown in FIG. 5) and the property management end or hotel management end (as shown in FIG. 6). The display and options on the screen of the indoor unit 300 are different and may be improved according to actual needs, but it is not limited to the illustrations of the drawings.

Please refer back to FIG. 2, the first electronic door lock 400 may be communicatively connected to the Internet service provider 200, and the first electronic door lock 400 may be arranged at a near-end door 1200 of the user's residence 1000. In some embodiments, the first electronic door lock 400 may be electrically connected to the Internet service provider 200 through a Power of Ethernet (POE) wiring 2000.

Figure 7:
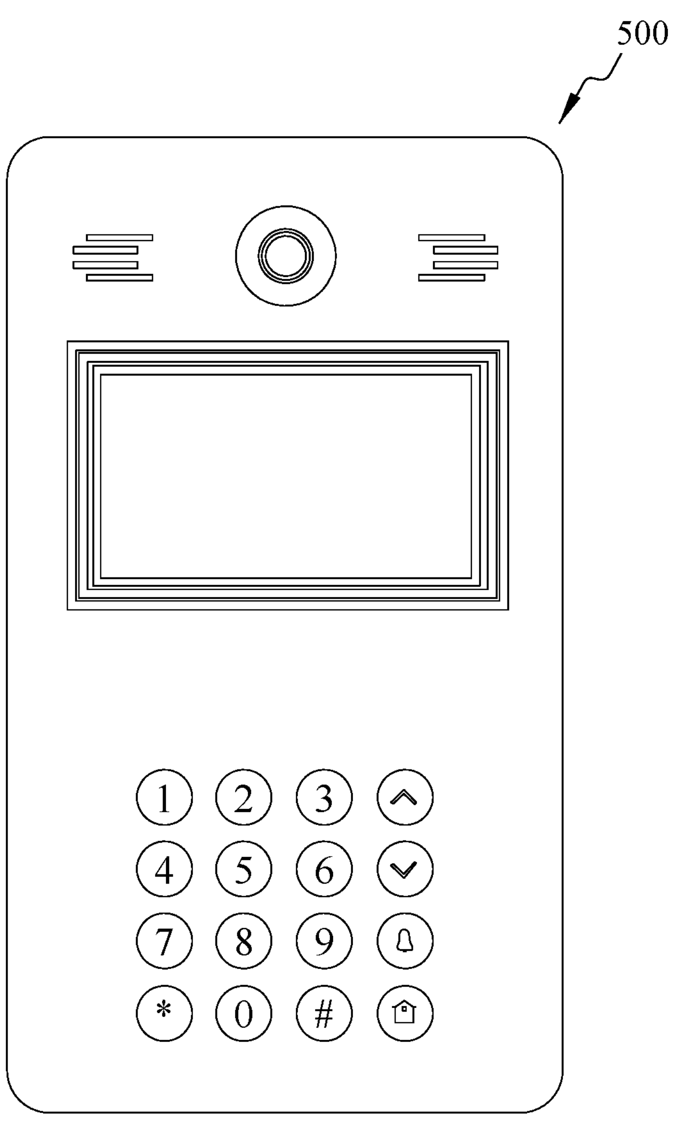
FIG. 7 is a schematic diagram of the outdoor unit in the electronic door lock intercom system according to the present invention.

FIG. 7 is a schematic diagram of the outdoor unit in the electronic door lock intercom system according to the present invention.

Please refer to FIG. 2 and FIG. 7, the outdoor unit 500 may be communicatively connected to the Internet service provider 200, and the outdoor unit 500 may be arranged at an outdoor location 1300 of the user's residence 1000. In some embodiments, the outdoor unit 500 may be an intercom with a display screen, but not limited thereto.

Please refer back to FIG. 2, the second electronic door lock 600 may be communicatively connected to the Internet service provider 200, and the second electronic door lock 600 may be arranged at a far-end door 1400 of the user's residence 1000. In some embodiments, the second electronic door lock 600 may be electrically connected to the Internet service provider 200 through the Power of Ethernet (POE) wiring 2000.

Figure 3:
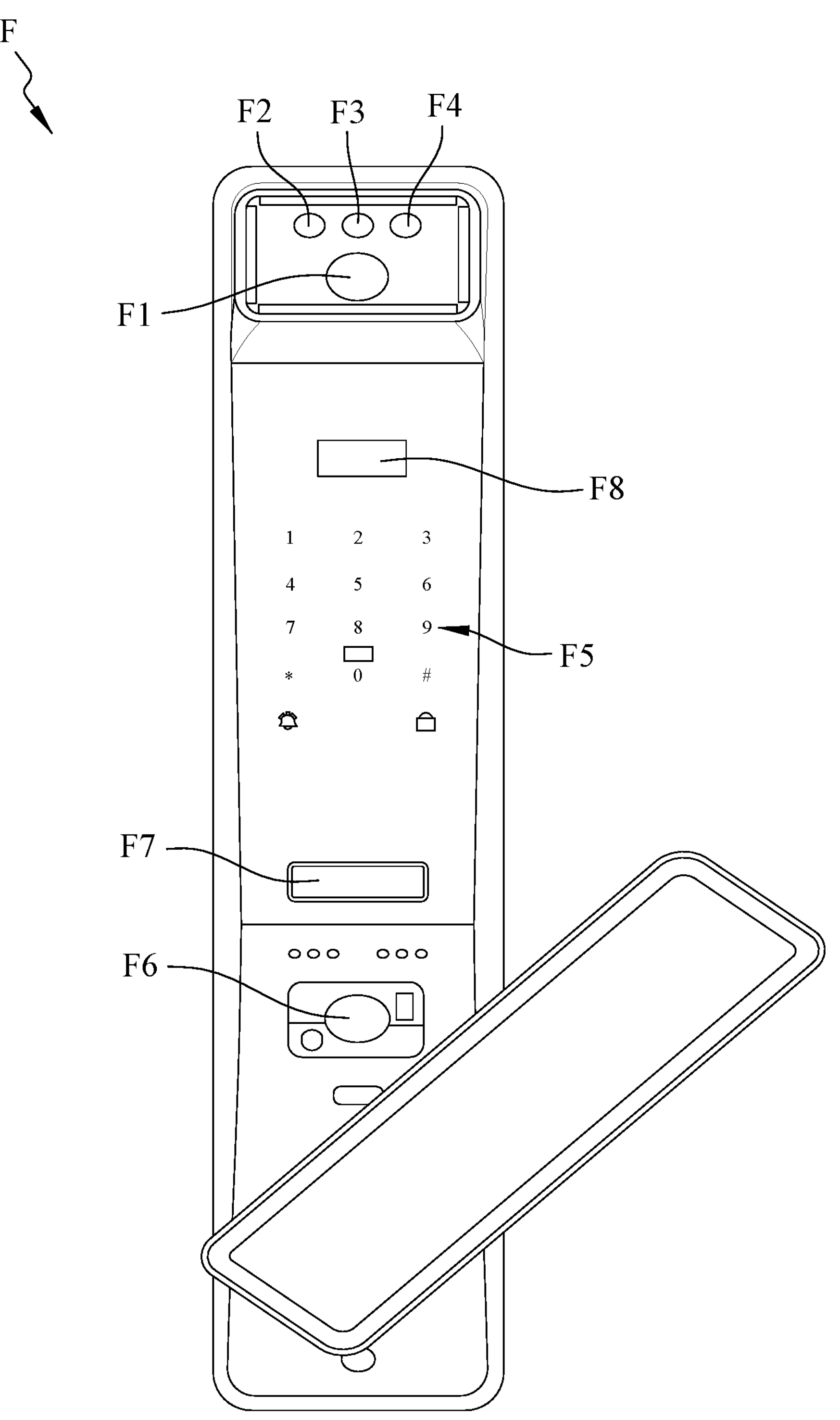
FIG. 3 is a schematic diagram of a front panel of an electronic lock of the electronic door lock intercom system according to the present invention.
Figure 4:
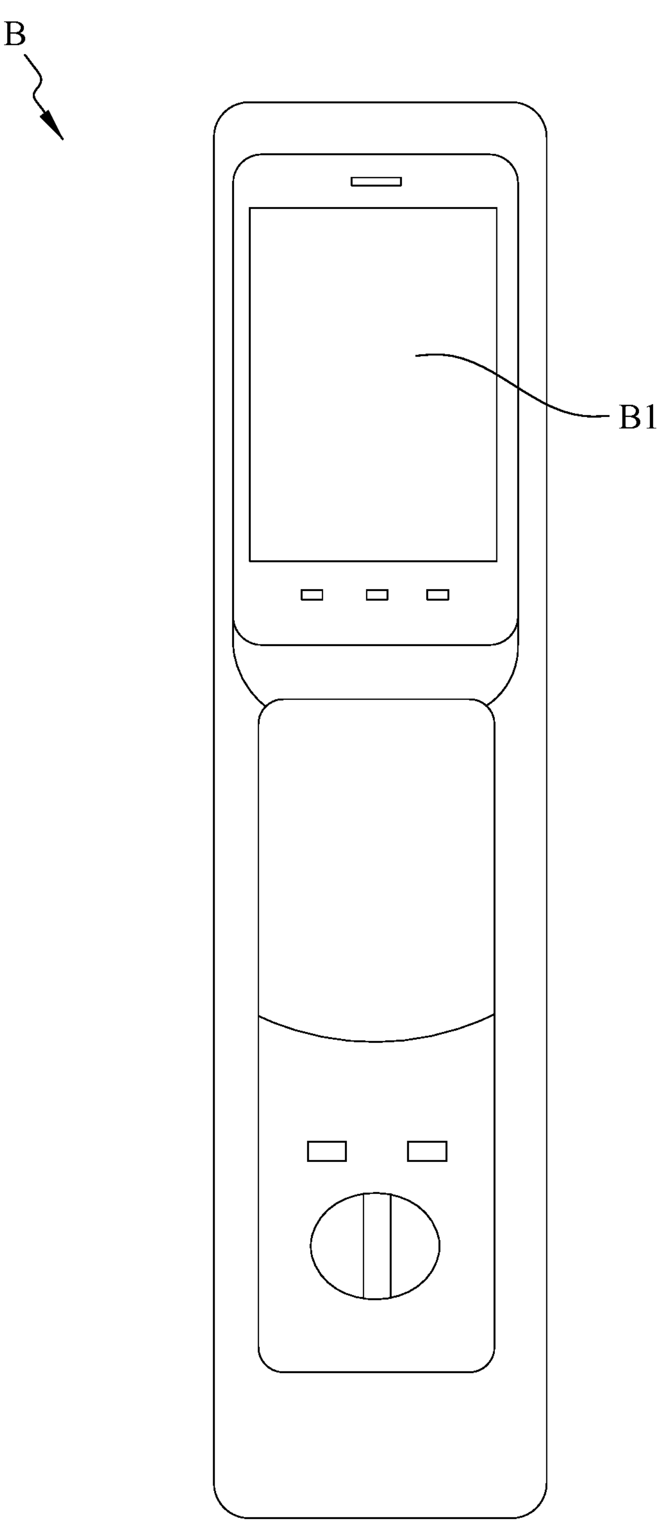
FIG. 4 is a schematic diagram of a rear panel of an electronic lock of the electronic door lock intercom system according to the present invention.

FIG. 3 is a schematic diagram of a front panel of an electronic lock of the electronic door lock intercom system according to the present invention. FIG. 4 is a schematic diagram of a rear panel of an electronic lock of the electronic door lock intercom system according to the present invention.

Please refer to FIG. 2 to FIG. 4, in some embodiments, the structure of the first electronic door lock 400 is similar to or the same as that of the second electronic door lock 600, the present invention is described using the first electronic door lock and the second electronic door lock with the same structure as an example, but not limited thereto. Both the first electronic door lock 400 and the second electronic door lock 600 may have a front panel F and a rear panel B, wherein the front panel F corresponds to the outside of the set door, and the rear panel B corresponds to the inside of the set door. As shown in FIG. 3, the front panel F includes an electronic cat's eye F1, a speckle projector F2, an infrared fill light F3, a face and palm vein infrared camera F4, a virtual password identifier F5, a physical keyhole F6 and a near field communication identifier F7. The electronic cat's eye F1, the speckle projector F2, the infrared fill light F3 and the face and palm vein infrared camera F4 may be arranged on an upper part of the front panel F, the physical keyhole F6 may be arranged on a lower part of the front panel F, and the virtual password identifier F5 and the near field communication identifier F7 may be arranged between the upper part and the lower part of the front panel F.

In some embodiments, the front panel F may further include an electronic doorbell F8. The electronic doorbell F8 may be arranged between the virtual password identifier F5 and the upper part of the front panel F.

As shown in FIG. 4, in some embodiments, the rear panel B includes an electronic cat's eye display screen B1. The electronic cat's eye display screen B1 may be electrically connected to the electronic cat's eye F1.

Referring back to FIG. 2, the application device 700 may communicate with the Internet service provider 200. In some embodiments, the cloud platform 100, the at least one indoor unit 300, the at least one first electronic door lock 400, the outdoor unit 500, the second electronic door lock 600 and the at least one application device 700 may be communicatively connected to the Internet service provider 200 through a wireless network (e.g., the Wi-Fi) 3000.

In some embodiments, the at least one application device 700 may be a smartphone 710, a tablet 720, and an Internet TV 730, but not limited thereto.

According to the above structure, an application program APP may be installed in the at least one application device 700. When the at least one first electronic door lock 400 or second electronic door lock 600 issues an abnormal alarm reminder notification, the abnormal alarm reminder notification is sent to the corresponding application program APP of the at least one application device 700 or through the wireless network 3000 to generate an alarm reminder, such as sound alarms, text alarms or other types of alarm reminders, so as to achieve remote monitoring and security management functions.

Figure 8:
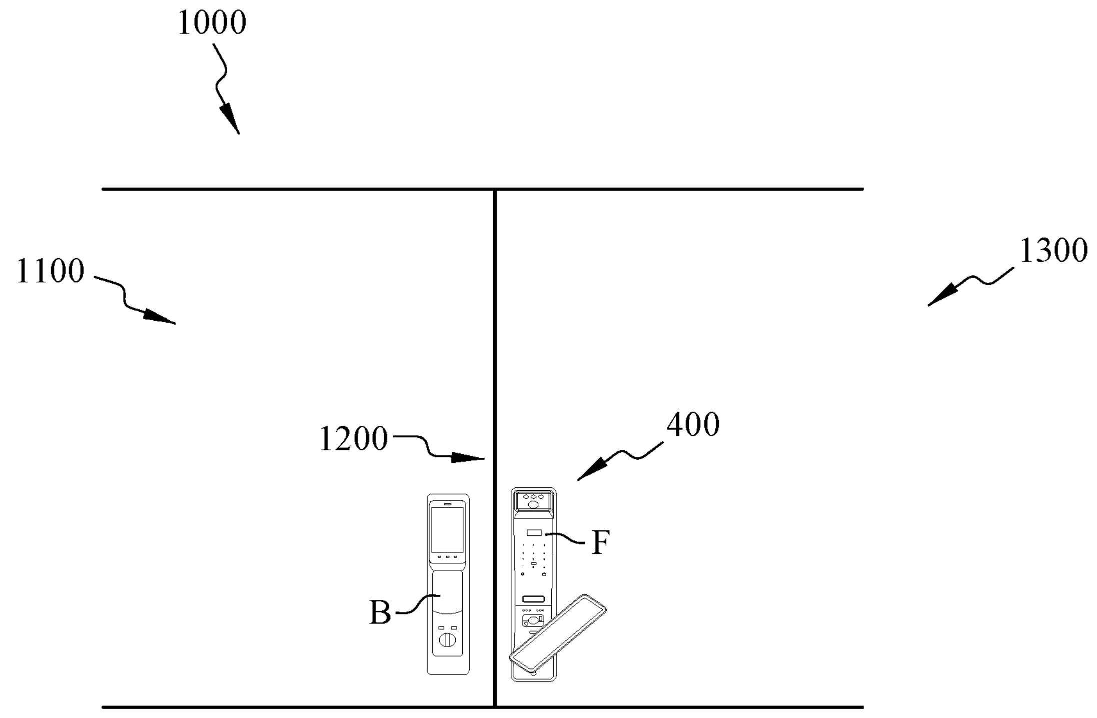
FIG. 8 is a schematic diagram of a simple door lock control in the electronic door lock intercom system according to the present invention.
Figure 8:
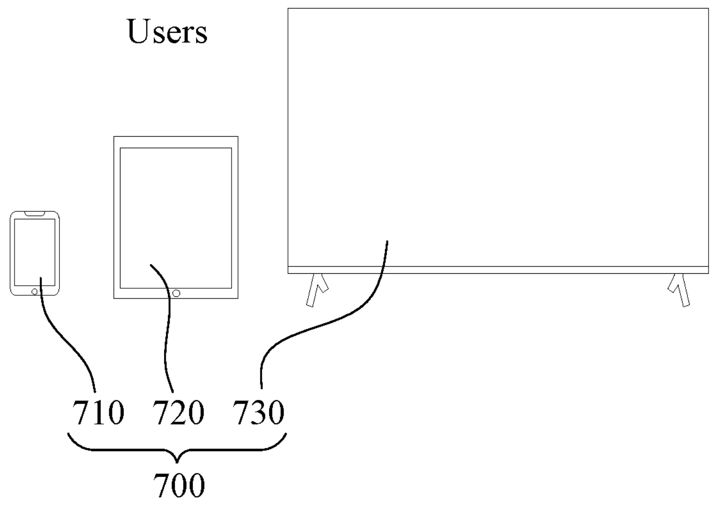

FIG. 8 is a schematic diagram of a simple door lock control in the electronic door lock intercom system according to the present invention.

As shown in FIG. 8, it is the configuration of the simplest version of the door lock control of the present invention. Please refer to FIG. 3, FIG. 4 and FIG. 8, when a visitor comes, the visitor may press the electronic doorbell F8 on the front panel F of the first electronic door lock 400; when the built-in electronic bell of the first electronic door lock 400 rings, the user may make audio-visual intercom calls through the electronic cat's eye display screen B1 on the rear panel B of the first electronic door lock 400 or the application device 700 (e.g. the smartphone 710, the tablet 720 and the Internet TV 730) with the installed application program APP. The method of opening the door includes two scenarios, that is, the user is at home and the user is not at home. If the user is at home, the user makes a video call through the electronic cat's eye display screen B1 of the first electronic door lock 400 or the application device 700 with the installed application program APP; after the visitor is confirmed, the door may be opened by itself or the door may be opened by remotely control through the application device 700 that has installed the application program APP. If the user is not at home, he/she may make a video call through the application device 700 with the installed application program APP; after the visitor is confirmed, the door may be opened by remotely control through the installed application program APP in the application device 700. Alternatively, the user may provide a time limit or one-time password (for the first electronic door lock 400) to the visitor in advance, and the visitor may key-in the password to the virtual password identifier F5 on the front panel F of the first electronic door lock 400 to open the door.

Figure 9:
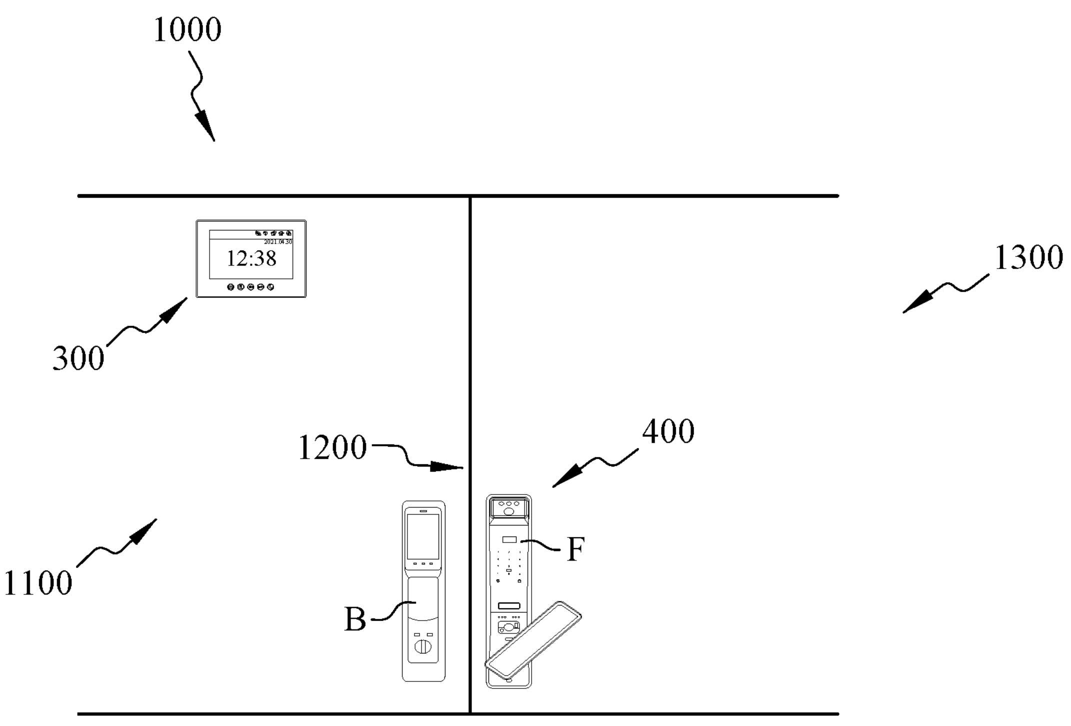
FIG. 9 is a schematic diagram of the configuration of personal door lock control of the electronic door lock intercom system according to the present invention.
Figure 9:
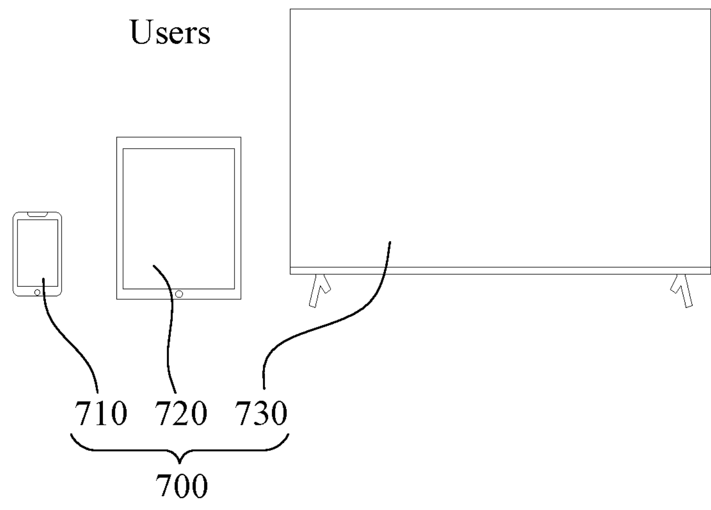

FIG. 9 is a schematic diagram of the configuration of personal door lock control of the electronic door lock intercom system according to the present invention.

As shown in FIG. 9, it is a configuration of door lock control suitable for individual users according to the present invention. Please refer to FIG. 3, FIG. 4 and FIG. 9, when a visitor comes, the visitor may press the electronic doorbell F8 on the front panel F of the first electronic door lock 400; when the built-in electronic bell of the first electronic door lock 400 rings, the user may make audio-visual intercom calls through the electronic cat's eye display screen B1 on the rear panel B of the first electronic door lock 400, or the application device 700 with the installed application program APP, or the indoor unit 300. The method of opening the door includes two scenarios, that is, the user is at home and the user is not at home. If the user is at home, the user makes a video call through the electronic cat's eye display screen B1 of the first electronic door lock 400, the application device 700 with the installed application program APP, or the indoor unit 300; after the visitor is confirmed, the door may be opened by itself or the door may be opened by remotely control through the installed application program APP in the application device 700. If the user is not at home, he/she may make a video call through the application device 700 with the installed application program APP. After the visitor is confirmed, the door may be opened by remotely control through the application program APP installed in the application device 700; alternatively, a time-limited password (for the first electronic door lock 400) is provided to the visitor in advance, and the visitor may key-in the password to the virtual password identifier F5 on the front panel F of the first electronic door lock 400 to open the door.

Figure 10:
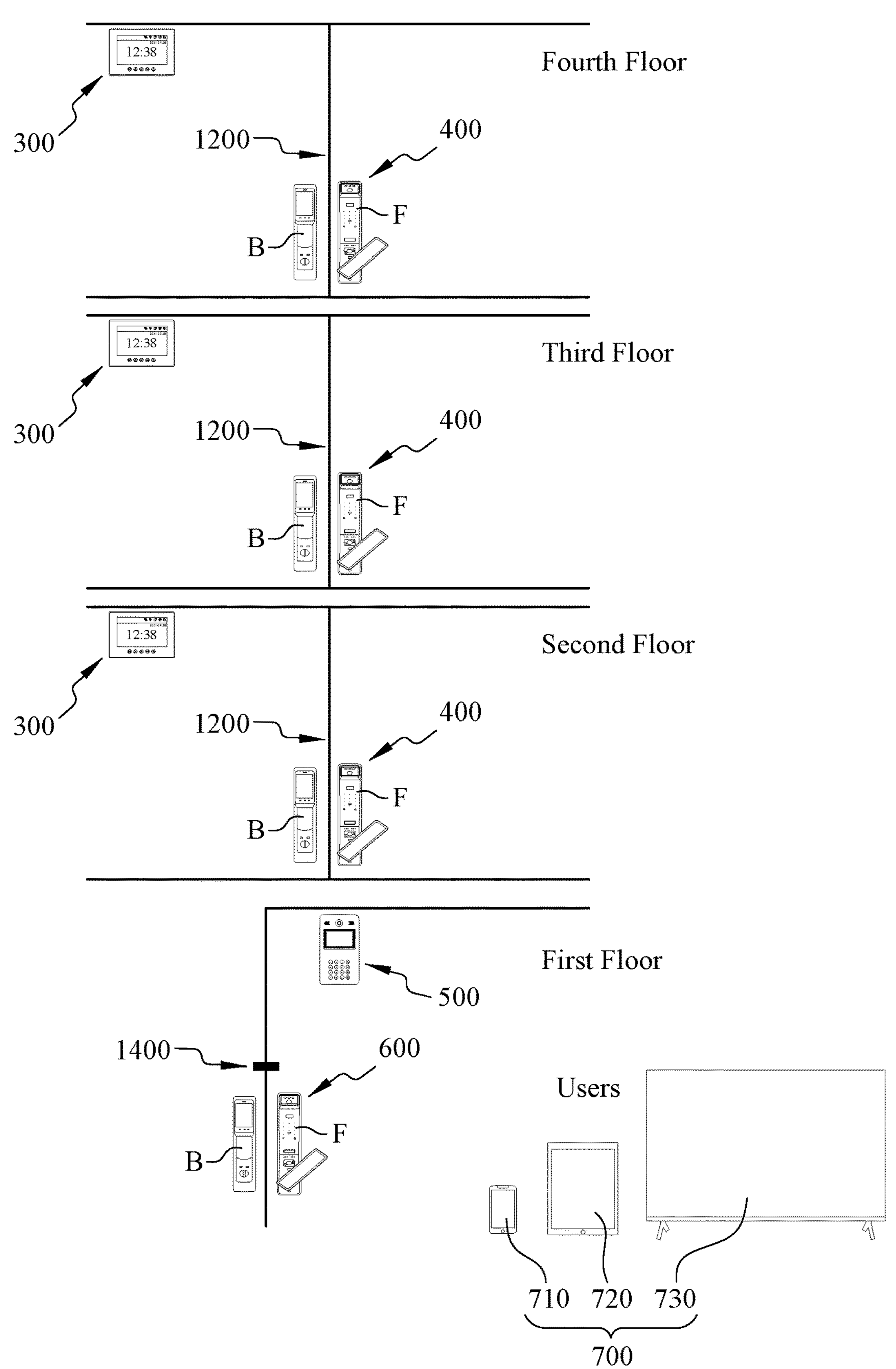
FIG. 10 is a schematic diagram of the configuration of door lock control used by users of communities and residential buildings without property management of the electronic door lock intercom system according to the present invention.

FIG. 10 is a schematic diagram of the configuration of door lock control used by users of communities and residential buildings without property management of the electronic door lock intercom system according to the present invention.

As shown in FIG. 10, it is a configuration of door lock control suitable for community and collective housing users without property management according to the present invention. Please refer to FIG. 3, FIG. 4 and FIG. 10, taking the example of each building for community and collective housing users to have a total of four floors; each indoor unit 300 on the second to fourth floors for community and collective housing users without property management, each first electronic door lock 400 (at the near-end door 1200 as shown in FIG. 2), and the outdoor unit on the first floor 500 and the second electronic door lock 600 at the far-end door on the first floor (i.e., 1400 as shown in FIG. 2) establish a group; when a visitor comes, the outdoor unit 500 on the first floor to call the corresponding floor may be pressed, and the indoor unit 300 on the corresponding floor or the application device 700 where the user has installed the application program APP will sound the doorbell prompt, the user may make audio-visual intercom calls through the electronic cat's eye display screen B1 on the rear panel B of the first electronic door lock 400, the application device 700 with the installed application program APP, or the indoor unit 300. The method of opening the door includes two scenarios, that is, the user is at home and the user is not at home. If the user is at home, he/she may make audio and video calls through the application device 700 with the installed application program APP or the indoor unit 300; after the visitor is confirmed, the door may be opened by itself or the door may be opened by remotely control through the application program APP installed in the application device 700. If the user is not at home, he/she may make a video call through the application device 700 with the installed application program APP. After the visitor is confirmed, the door can be opened remotely through the application APP installed in the application device 700; alternatively, a time-limited password (for the first electronic door lock 400 and the second electronic door lock 600 respectively) is provided to the visitor in advance, and the visitor may key-in the password to the virtual password identifier F5 on each front panel F of the first electronic door lock 400 and the second electronic door lock 600 to open the door.

Figure 11:
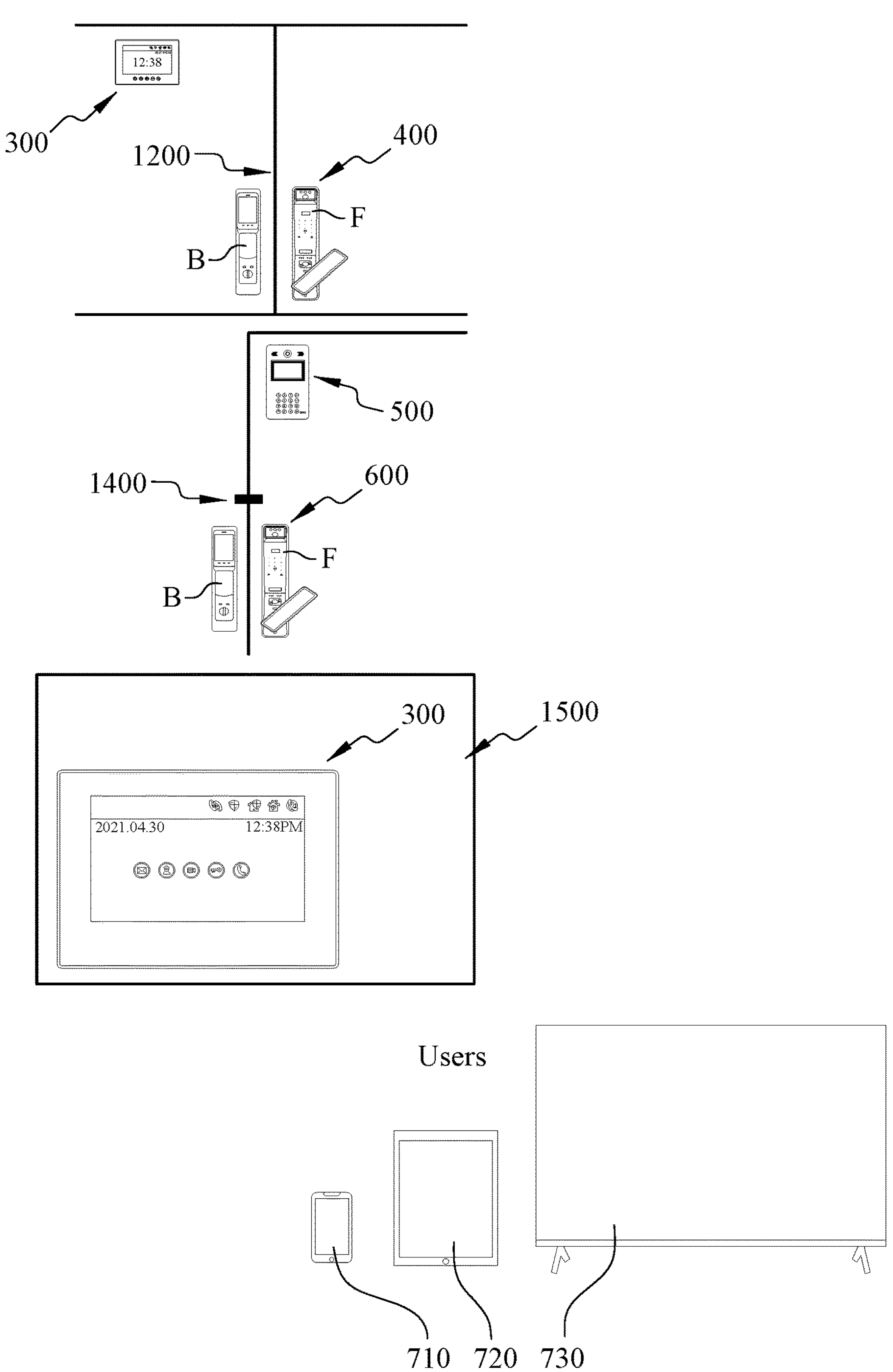
FIG. 11 is a schematic diagram of the configuration of door lock control used by community and collective housing users and property management of the electronic door lock intercom system according to the present invention.

FIG. 11 is a schematic diagram of the configuration of door lock control used by community and collective housing users and property management of the electronic door lock intercom system according to the present invention.

As shown in FIG. 11, it is a configuration of door lock control suitable for community and collective housing users and has a door lock control configuration used for property management according to the present invention. Please refer to FIG. 3, FIG. 4 and FIG. 11, the indoor units 300 for community and collective housing users with property management, the first electronic door lock 400, the second electronic door lock 600 in the public area (that is, the far-end door 1400 as shown in FIG. 2), the outdoor unit 500 in the public area, and the indoor unit 300 (or property management machine) in the property management room 1500 establish a group. When a visitor comes, the visitor must first enter the property management room 1500 for visitor registration. After recording the identity of the visitor, the property management calls the user through the indoor unit 300 of the property management room 1500, and the doorbell prompt sounds on the indoor unit 300 corresponding to the user or the application device 700 that has installed the application program APP, and the user may make audio-visual intercom calls through the indoor unit 300 or the application device 700 with the installed application program APP. After the property management and the user confirm whether the visitor is allowed, the indoor unit 300 of the property management room 1500 will help the visitor create relevant information, and choose one of the following methods: (1) establishing a time-limited 3D structured light face recognition or palm vein recognition; (2) establishing a time-limited NFC (Near Field Communication) access card; (3) establishing a time-limited or one-time door lock password; and (4) remotely controlling the second electronic door lock 600 of the public area (i.e., the far-end door 1400 as shown in FIG. 2) to open.

Figure 12:
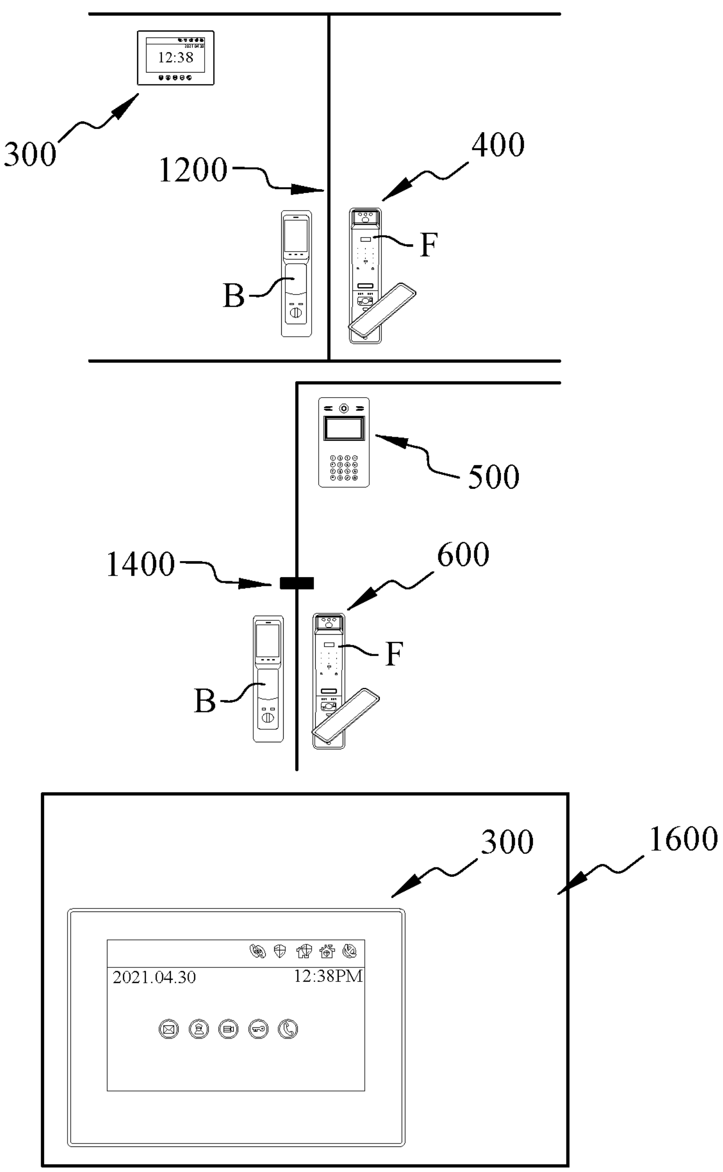
FIG. 12 is a schematic diagram of the configuration of the door lock control used by hotel users and front desk management of the electronic door lock intercom system according to the present invention.

In the aforementioned description of "Establishing a time-limited 3D structured light face recognition or palm vein recognition", the residents and passengers create their face recognition or palm vein recognition data in the indoor unit 300 (or property management machine) in the property management room 1500 or the indoor unit 300 (or hotel management machine) in the hotel front desk management room 1600 (as shown in FIG. 12), the data is sent to the first electronic door lock 400 of the corresponding public area and corresponding room, residents and visitors may directly identify and pass within the validity period. After the expiration date, the data will be automatically deleted and residents and passengers will not be able to access it. However, if residents and visitors have privacy concerns, they may also use passwords or NFC cards that establish an expiration date.

Please refer back to FIG. 3, FIG. 4 and FIG. 11, the method of opening the door includes two scenarios, that is, the user is at home and the user is not at home. If the user is at home, he/she may make a video call through the application device 700 with the installed application program APP or the indoor unit 300 in the property management room 1500 (the property confirms the visitor's identity), and after the visitor presses the electronic doorbell F8 on the front panel F of the first electronic door lock 400 of the room door, the user may make video calls through the electronic cat's eye display screen B1 on the rear panel B of the first electronic door lock 400 or the application device 700 with the installed application program APP. After the visitor is confirmed (confirming the visitor's identity in front of the resident's door), the user may open the door by himself or remotely control the door through the application program APP installed in the application device 700. If the user is not at home, the user may make a video call through the application device 700 with the installed application program APP (property management confirms the visitor's identity), and after the visitor presses the electronic doorbell F8 on the front panel F of the first electronic door lock 400 of the room door and the visitor confirms the visitor through the application device 700 with the installed application program APP (confirm the visitor's identity in front of the resident's room), the visitor may remotely open the door through the application program APP installed in the application device 700; alternatively, a time-limited password (for the first electronic door lock 400) is provided to the visitor in advance, and the visitor may key-in the password to the virtual password identifier F5 on the front panel F of the first electronic door lock 400 to open the door.

FIG. 12 is a schematic diagram of the configuration of the door lock control used by hotel users and front desk management of the electronic door lock intercom system according to the present invention.

As shown in FIG. 12, it is a configuration of door lock control suitable for hotel users and front desk management according to the present invention. Please refer to FIG. 3, FIG. 4 and FIG. 12, the indoor unit 300 of the hotel room of the hotel user (i.e. the passenger), the first electronic door lock 400 of the hotel room of the hotel user (i.e. the passenger), the second electronic door lock 600 in the public area (that is, the far-end door 1400 as shown in FIG. 2), the outdoor unit 500 in the public area, and the indoor unit 300 (or may be called a hotel management machine) in the hotel front desk management room 1600 establish a group. When there is a passenger staying, first go to the hotel front desk management room 1600 to contact the visitor registration. After the hotel front desk management records the passenger's identity, the hotel front desk management may then help the visitor create relevant information through the indoor unit 300 in the hotel front desk management room 1600, and choose one of the following methods: (1) establishing a time-limited 3D structured light face recognition; (2) establishing a time-limited NFC access card; and (3) establishing a time-limited door lock password, to open the hotel room door and related usable public areas. The method of opening the door includes two situations, that is, the passenger is not in the room when the passenger's visitor comes, and the passenger is in the room. When the passenger is not in the room and the visitor comes to visit, the visitor must first enter the hotel front desk management room 1600 for visitor registration. After the front desk management records the identity of the visitor, the passenger is called through the indoor unit 300 in the hotel front desk management room 1600. The indoor unit 300 in the corresponding room sounds the doorbell prompt, and the passenger may make an audio-visual intercom call through the indoor unit 300 in the room; after confirming with the front desk management and the passenger whether the visitor has been released, the visitor may then create relevant information for the visitor through the indoor unit 300 in the hotel front desk management room 1600. When the passenger is in the room, the visitor makes a video call through the indoor unit 300 in the hotel front desk management room 1600 (the hotel front desk confirms the visitor's identity), and after the visitor presses the electronic doorbell F8 on the front panel F of the first electronic door lock 400, the passenger may open the door by himself after confirming the visitor through the electronic cat's eye display screen B1 on the rear panel B of the first electronic door lock 400 (confirming the visitor's identity in front of the room door).

For the indoor unit 300 (or hotel management unit) in the hotel front desk management room 1600, there is no application program APP for passengers. They may only enter the room through the access control management information created by the hotel front desk management room 1600, establishment of the hotel management function, and remote control of the access control management of the passenger's room door and public areas. Therefore, the difference between the indoor unit 300 (or property management unit) in the property management room 1500 and the indoor unit 300 (or hotel management unit) in the hotel front desk management room 1600 is that, for the property management unit, the residents may use the application program APP of the application device 700 to remotely control the opening of the resident's door, for the property management machine, it may only establish and remotely control the access control part of the public area.

Figure 13:
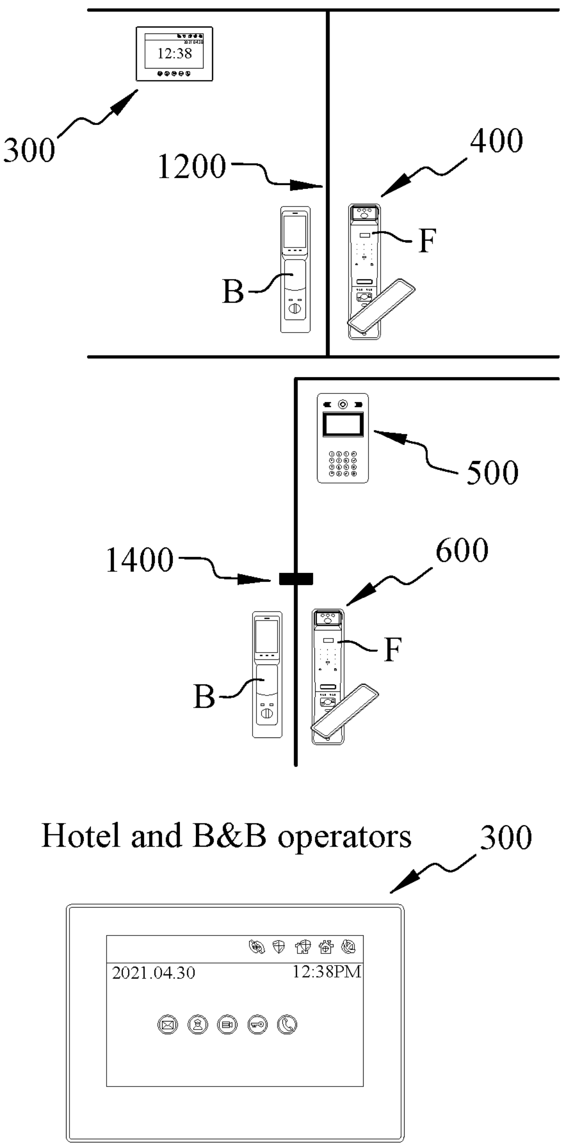
FIG. 13 is a schematic diagram of the configuration of the door lock control used by hotel and B&B operators without front desk management of the electronic door lock intercom according to the present invention.

FIG. 13 is a schematic diagram of the configuration of the door lock control used by hotel and B&B operators without front desk management of the electronic door lock intercom according to the present invention.

As shown in FIG. 13, it is a configuration of door lock control suitable for users of hotels and B&B operators without front desk management according to the present invention. Please refer to FIG. 3, FIG. 4 and FIG. 13, the indoor unit 300 of the hotel room of the hotel user (i.e. the passenger), the first electronic door lock 400 of the hotel room of the hotel user (i.e. the passenger), the second electronic door lock 400 of the public area (i.e. the remote door 1400 as shown in FIG. 2), the outdoor units 500 in public areas and the indoor units 300 (or hotel management units) in hotels and B&B operators establish a group. When a passenger requests a room to stay, first contact the hotel and B&B operators to check in. After the hotel and B&B operators confirm the visitor's identity, they can then help the visitor create relevant information through the hotel and B&B operator's indoor machine 300, and establish a time-limited door lock password to open the first electronic door lock 400 of the hotel or B&B door and the second electronic door lock 600 of the related usable public area. The method of opening the door includes two situations, that is, the passenger is not in the room when the passenger's visitor comes, and the passenger is in the room. When the passenger is not in the room but the visitor comes, the passenger directly provides the hotel and B&B operator with a time-limited password for the visitor to enter the public area for controlling access control. When the passenger is in the room, the visitor may press the electronic doorbell F8 on the front panel F of the first electronic door lock 400, and then the passenger may see the electronic cat's eye display screen B1 on the rear panel B of the first electronic door lock 400 to confirm the visitor (confirming the visitor's identity in front of the room door) to open the door by himself/herself.

Figure 14:
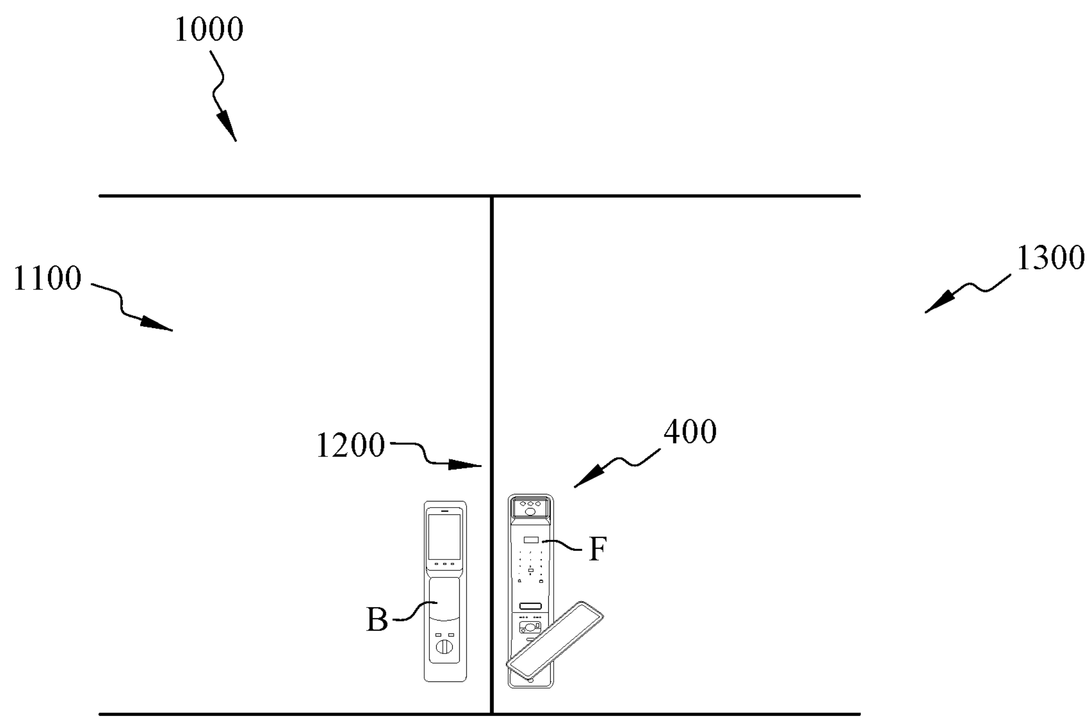
FIG. 14 is a schematic diagram of the configuration of the door lock control used by social workers to care for the elderly living alone in the electronic door lock intercom system according to the present invention.
Figure 14:
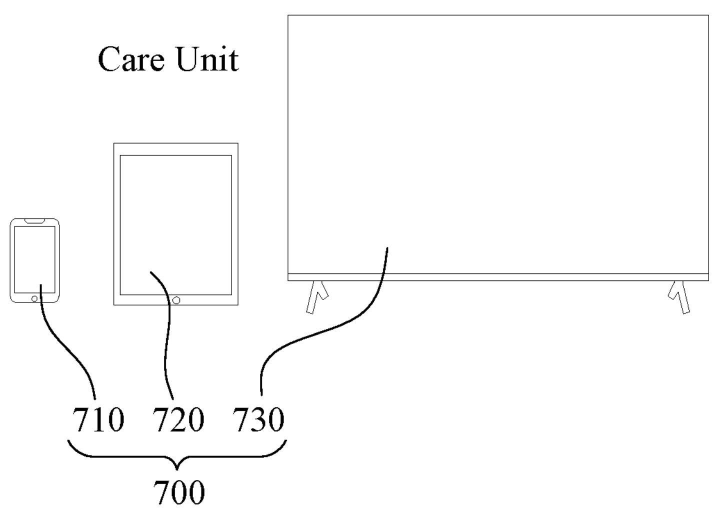

FIG. 14 is a schematic diagram of the configuration of the door lock control used by social workers to care for the elderly living alone in the electronic door lock intercom system according to the present invention.

As shown in FIG. 14, it is a configuration of door lock control suitable for social workers to care for the elderly living alone according to the present invention. Please refer to FIG. 3, FIG. 4 and FIG. 14. The indoor unit 300, the first electronic door lock 400 and the outdoor unit 500 of community and collective housing users establish a group. When there is a need to care for the elderly living alone, the application device 700 of the authorized care unit (for example, community director, administrator, social worker of the Social Affairs Bureau) is installed with a (client)

application program APP. The authorized care unit may make audio and video calls with the user's indoor unit 300 through the application device 700 that has installed the (client) application program APP to provide regular care and required assistance. Alternatively, the user may call help through the emergency help shortcut key of the user's indoor unit 300 and the authorized care unit (for example, community director, administrator, social worker of the Social Affairs Bureau) of the application device 700 that has installed the (client) application program APP. Alternatively, through the entry and exit records of the door locks during the normal working hours of the elders at home, you may confirm whether there are any abnormalities to proactively provide care. The method of opening the door is to set the password of the first electronic door lock 400 for the elderly living alone who need intervention care and give it to the authorized care unit (for example, the community director-general, administrator, social worker of the Social Affairs Bureau) for management. When there is an emergency, authorized care units (for example, community directors, administrators, social workers of the Social Affairs Bureau) may immediately enter the home to provide assistance.

Figure 15:
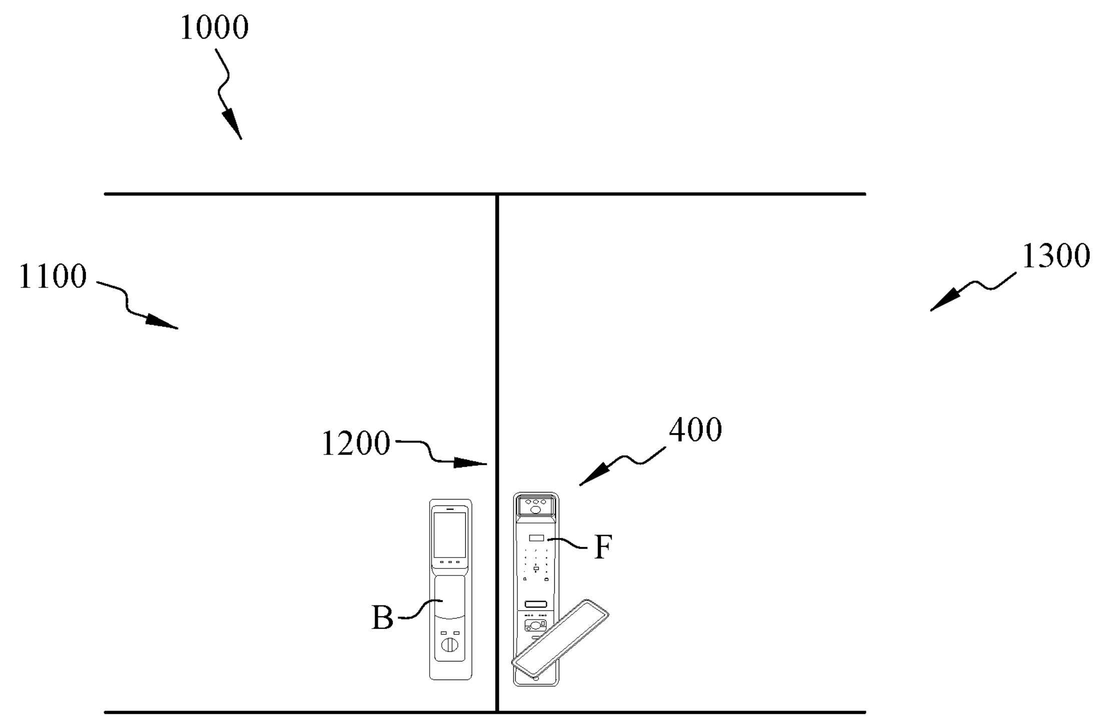
FIG. 15 is a schematic diagram of the configuration of the door lock control used in the electronic door lock intercom system according to the present invention for elders and children with dementia staying at home temporarily.
Figure 15:
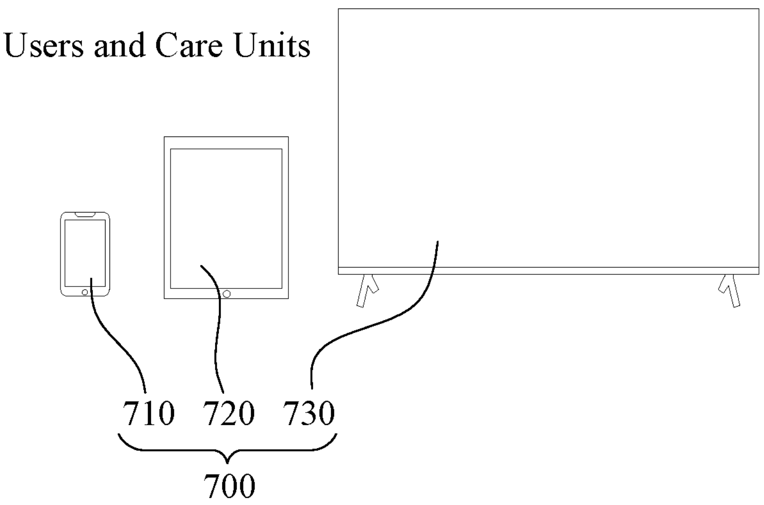

FIG. 15 is a schematic diagram of the configuration of the door lock control used in the electronic door lock intercom system according to the present invention for elders and children with dementia staying at home temporarily.

As shown in FIG. 15, it is a configuration of door lock control suitable for elders and children with dementia staying at home temporarily according to the present invention. Please refer to FIG. 3, FIG. 4 and FIG. 15, the indoor unit 300, the first electronic door lock 400 and the outdoor unit 500 of community and collective housing users establish a group. When an elder or child with dementia needs to stay at home temporarily, the resident may control the home door lock through the application program APP of the application device 700, such as locking or unlocking. When locked, there is no way to unlock and leave the room to avoid accidents caused by dementia elders and children leaving the home (but for safety reasons, the door may be also unlocked from the room through a composite key or a method that is difficult for children and dementia elders to operate). In addition, the application device 700 with the installed (client) application program APP may make audio and video calls with the user's indoor unit 300 for care and assistance, or the emergency help shortcut key of the indoor unit 300 may be used with the installed (client) application program APP of the application device 700 held by the user or the installed (client) application program APP of the application device 700 held by the authorized care unit (for example, community director, administrator, social worker of social bureau) to call help, or the entry and exit record time of the first electronic door lock 400 may be used to confirm whether there is an abnormal record. As for the method of opening the door, when it is necessary to temporarily stay at home for the elderly or children with dementia, the resident may control the home door lock through the application program APP of the application device 700, such as locking or unlocking. When locked, there is no way to unlock and leave the room (but for safety reasons, the door may be also unlocked from the room through a composite key or a method that is difficult for children and dementia elders to operate).

Through the above scenarios and door lock control configuration, when the first electronic door lock 400 or the second electronic door lock 600 sends an abnormal alarm reminder notification, the abnormal alarm reminder notification is sent to the user or the application device 700 of the authorized care unit installed with the application program APP through the wireless network 3000 to generate an alarm reminder, such as a sound alarm, a text alarm, or other types of alarms, thereby achieving the functions of remote monitoring and security management.

The above descriptions are only used to explain the preferred embodiments of the present invention, and are not intended to limit the present invention in any form. Therefore, any modifications or changes made to the present invention under the same inventive spirit should still be included in the scope of protection intended by the present application.

The invention claimed is:

1. An electronic door lock intercom system for a plurality of housing units and a public area of the housing units, comprising:

a cloud platform;

an Internet service provider, communicated with the cloud platform;

a plurality of indoor audio/video intercom units communicatively connected to the Internet service provider, each of the indoor audio/video intercom units being installed in an indoor location of a corresponding housing unit of the plurality of housing units;

a plurality of first electronic door locks communicatively connected to the Internet service provider, each of the first electronic door locks being installed at a local gate of a corresponding housing unit of the plurality of housing units;

an outdoor visitor-call intercom unit communicatively connected to the Internet service provider, the outdoor visitor-call intercom unit being installed at an outdoor location in the public area of the housing units;

a second electronic door lock communicated with the Internet service provider, the second electronic door lock being installed at a remote gate in the public area of the housing units; and at least one application device, communicated with the Internet service provider;

wherein the electronic door lock intercom system is configurable for managing entrance of each housing unit with and without property management.

2. The electronic door lock intercom system according to claim 1, wherein the cloud platform, the indoor audio/video intercom units, the first electronic door locks, the outdoor visitor-call intercom unit, the second electronic door lock and the at least one application device are communicated with the Internet service provider through a wireless network.

3. The electronic door lock intercom system according to claim 1, wherein the first electronic door locks and the second electronic door lock are electrically connected to the Internet service provider through an Ethernet power supply wiring.

4. The electronic door lock intercom system according to claim 1, wherein the Internet service provider is a network switch or a router.

5. The electronic door lock intercom system according to claim 1, wherein the at least one application device is a smartphone, a tablet and an Internet TV.

6. The electronic door lock intercom system according to claim 1, wherein the first electronic door locks and the second electronic door lock each have a front panel and a rear panel.

7. The electronic door lock intercom system according to claim 6, wherein the front panel includes an electronic cat's eye, a speckle projector, an infrared fill light, a face and palm vein infrared camera, a virtual password identifier, a physical keyhole and a near field communication identifier, the electronic cat's eye, the speckle projector, the infrared fill light and the face and palm vein infrared camera are arranged on an upper part of the front panel, the physical keyhole is arranged on a lower part of the front panel, and the virtual password identifier and the near field communication identifier are arranged between the upper part and the lower part of the front panel.

8. The electronic door lock intercom system according to claim 7, wherein the front panel further includes an electronic doorbell disposed between the virtual password identifier and the upper part.

9. The electronic door lock intercom system according to claim 8, wherein the rear panel includes an electronic cat's eye display screen, which is electrically connected to the electronic cat's eye.

10. The electronic door lock intercom system according to claim 1, wherein the at least one application device has an application program installed, and when the first electronic door locks or the second electronic door lock sends an abnormal alarm reminder notification, the abnormal alarm reminder notification is transmitted to the at least one application device corresponding to the application program through a wireless network to generate an alarm reminder.

* * * * *